(No Model.)
R. M. ROSS & E. J. KLINCK.
FAN FOR DENTAL ENGINES.
No. 290,359. Patented Dec. 18, 1883.
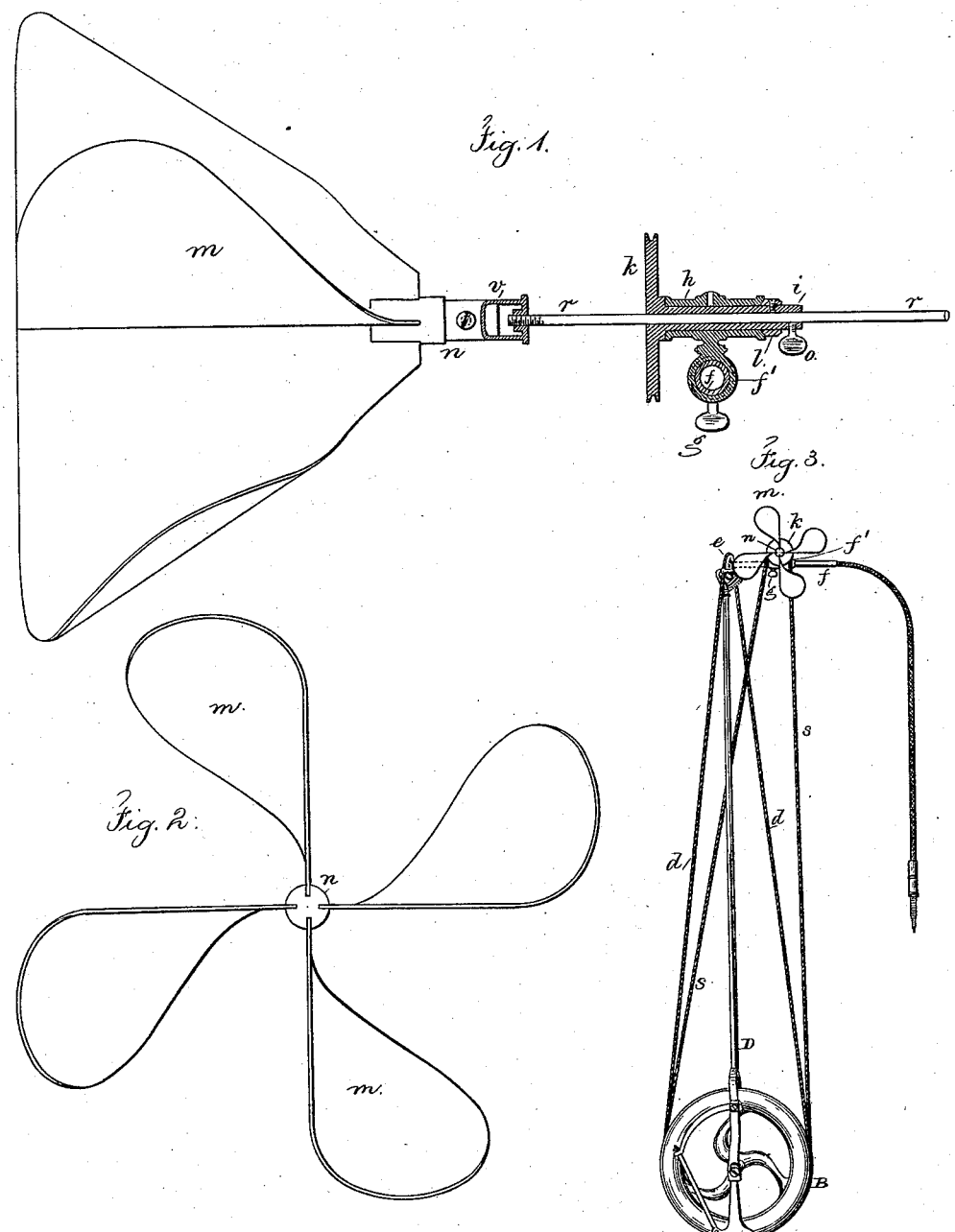

UNITED STATES PATENT OFFICE.

ROBERT M. ROSS AND E. JAY KLINCK, OF UTICA, NEW YORK.

FAN FOR DENTAL ENGINES.

SPECIFICATION forming part of Letters Patent No. 290,359, dated December 18, 1883.

Application filed September 17, 1883. (No model.)

*To all whom it may concern:*

Be it known that we, ROBERT M. ROSS and E. JAY KLINCK, of Utica, in the county of Oneida and State of New York, have invented an Improvement in Fans for Dental Engines, of which the following is a specification.

Dental engines of various kinds have been made in which a treadle is operated to revolve a fly-wheel, and from this a cord passes to a pulley that is at the top of a rocking standard and connected with a flexible shaft within a hollow arm, and to the end of this flexible shaft the hand-piece of the engine is affixed, so that the tool is revolved by the flexible shaft. The hollow arm near the pulley is usually a rigid tube. Upon this hollow arm we affix an adjustable bearing-piece and a fan, the same being constructed and arranged in such a manner that the fan receives its motion from a cord to the fly-wheel, and serves to throw a current of air upon the person whose teeth are being operated upon, the object being to produce an agreeable ventilation and change of atmosphere, at the same time keeping flies away and promoting the comfort of the person, and preventing the risk of injury to teeth or to the drill by any sudden movement of either the patient or the operator consequent upon the sting or bite of any insect.

The improvement is represented as applied to a dental engine with a rocking standard; but it may be placed upon the arm of a hand engine or lathe, or upon a suspension dental engine, the attaching parts for the fan being properly shaped.

In the drawings, Figure 1 is an elevation partially in section of the fan attachment. Fig. 2 is an elevation endwise of the fan, and Fig. 3 is a perspective view of the entire dental engine and fan.

The base A, fly-wheel B, treadle C, rocking standard D, belt $d$, pulley $e$, with arm $f$, and flexible shaft within such arm leading to the hand-piece of the engine are of ordinary character. The tubular sleeve $f'$ is adapted to be passed over the rigid portion of the hollow arm $f$, and secured at the proper place by a clamping-screw, $g$. There is a tubular bearing, $h$, that is connected to the sleeve $f'$, either rigidly or by a swivel, and this bearing $h$ has through it a tubular shaft, $i$, with a grooved wheel, $k$, on one end and a collar, $l$, with a set-screw around the other end, and this collar prevents the tubular shaft moving endwise in its bearing, but allows such shaft to be rotated freely. The fan $m$ is upon a hub, $n$, at one end of the spindle $r$. The blades of the fan are curved forwardly, and are of the triangular shape represented, so that when rotated they will project a current of air endwise of the shaft. The spindle $r$ is passed through the tubular shaft $i$ and clamped to it by the screw $o$. The hub $n$ is preferably provided with a metal socket, $v$, at the end, with a female screw to receive the threaded end of the spindle $r$, the edges of the socket being milled.

It is now to be understood that the grooved wheel $k$, tubular shaft $i$, spindle $r$, and fan $m$ are to be revolved by a cord, $s$, passing over the grooved wheel $k$ and down around the fly-wheel B. This cord $s$ is small, and it will run in the groove of the fly-wheel either beneath or at the side of the main belt $d$ without interfering with the same. The spindle $r$ of the fan can be moved along through the tubular shaft $i$ and clamped to it at any desired place, so that the fan can be properly placed for directing its current upon the person that is being operated upon by the dentist, so as to produce an agreeable circulation of air, keep off insects, and cool the person. The spindle can be unscrewed from the hub of the fan, so that a fan of a different shape may be applied on the spindle.

This fan is useful where the patient has been placed under the influence of an anesthetic to restore consciousness.

We claim as our invention—

1. The combination, with the fan $m$ and spindle $r$, of the tubular shaft $i$, through which the spindle may be adjusted endwise, the clamping-screw $g$, tubular bearing $h$, and tubular sleeve $f'$, whereby the fan is adapted to be affixed to and adjusted upon the dental engine, substantially as set forth.

2. The fan composed of curved blades attached to a hub, in combination with the spindle, tubular shaft, through which the spindle passes and is adjustable endwise, the driving-pulley, and the bearing for supporting the tubular shaft, substantially as set forth.

Signed by us this 12th day of September, A. D. 1883.

ROBERT M. ROSS.
E. JAY KLINCK.

Witnesses:
CHARLES H. CARR,
A. H. BALLOU.